(12) United States Patent
Sawai et al.

(10) Patent No.: US 6,810,487 B2
(45) Date of Patent: Oct. 26, 2004

(54) CORBA PARTIAL RESTART SYSTEM IN BUILT-IN DEVICE

(75) Inventors: Shinsuke Sawai, Tokyo (JP); Nobuhisa Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 603 days.

(21) Appl. No.: 09/820,784

(22) Filed: Mar. 30, 2001

(65) Prior Publication Data

US 2001/0027535 A1 Oct. 4, 2001

(30) Foreign Application Priority Data

Mar. 30, 2000 (JP) ........................................ 2000-095049

(51) Int. Cl.[7] .............................................. G06F 11/00
(52) U.S. Cl. ................... 714/4; 714/5; 714/23
(58) Field of Search .................. 714/4, 5, 23

(56) References Cited

U.S. PATENT DOCUMENTS 5,923,833 A * 7/1999 Freund et al. ................. 714/19
6,502,103 B1 * 12/2002 Frey et al. .............. 707/103 R

OTHER PUBLICATIONS

Maffeis, SIlvano; "Piranha: A CORBA Tool For High Availability"; Apr., 1997; IEEE Computer; vol. 30, Issue 4; pp. 59–66.*

* cited by examiner

Primary Examiner—Scott Baderman
Assistant Examiner—Joshua Lohn
(74) Attorney, Agent, or Firm—Young & Thompson (57) ABSTRACT

In a CORBA partial restart system in a built-in device, a sole restart of a CORBA library, a server and a client can be carried out without restarting the whole built-in device. The client gives a notification that an accident or a defective condition arises in the CORBA library and the client itself to a control section. The server gives a notification that the defective condition arises in the CORBA library and the server itself to the control section. When receiving the notification of the defective condition, the control section stops processes of the client, the server and the CORBA library. The control section releases their memory areas when the memory areas are not released after stopping their processes. Then, the control section restarts the processes of the client, the server and the CORBA library. Constructors of the client and the server reserve the memory areas for their own uses. A memory controller produces memory information of the reserved memory areas.

24 Claims, 4 Drawing Sheets

CORBA PARTIAL RESTART SYSTEM IN BUILT-IN DEVICE

BACKGROUND OF THE INVENTION

The present invention relates to a distributed object technique and more particularly to a CORBA partial restart system in a built-in device.

PRIOR ART

The CORBA (Common Object Request Broker Architecture) is used as a standard architecture of a distributed object technique. Clients can invoke objects from a server on a network in a remote control manner. On such invocations, the clients need not consider the position of the server, used OSs and used languages.

In not a normal host containing only a CORBA function, a server and a client, but a built-in device such as an exchange containing a particular function in addition to only the CORBA function, the server and the client, when an accident arises in a CORBA library including an ORB (Object Request Broker) core, an ORB interface, a static stub interface, a dynamic call interface, an object adaptor, a static skeleton interface and a dynamic skeleton interface, the server or the client and communication using the CORBA cannot be possible, a restart of the built-in device is required. However, in the built-in device which requires keeping the operations of its own functions and does not want frequent restarts of its whole device, it is demanded a function to restart only each of the CORBA library, the server and the client.

When the built-in device is an exchange, for example, the particular function not to be restarted includes a calling function, a money imposition function and the like.

SUMMARY OF THE INVENTION

It is therefore an object of the present invention to provide a CORBA partial restart system in a built-in device, in view of the aforementioned disadvantages of the prior art, which is capable of restarting only a CORBA library, a server and a client independently without restarting the whole built-in device when an accident arises in the CORBA library, the server and the client.

In accordance with one aspect of the present invention, there is provided a CORBA partial restart system in a built-in device, comprising a memory controller; a client; a server; and a control section; the memory controller controlling memory areas used for the client, the server and a CORBA library by memory information; the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself; the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself; the control section including means for stopping processes of the client, the server and the CORBA library when the defective condition of at least one of the client, the server and the CORBA library is given from at least one of the client and the server; and means for restarting the processes of the client, the server and the CORBA library when the memory areas used for the client, the server and the CORBA library are released after stopping the processes of the client, the server and the CORBA library.

In a CORBA partial restart system in a built-in device of the present invention, the CORBA library includes a memory clearer which refers to the memory information and releases the memory areas used for the client, the server and the CORBA library in response to a memory release instruction sent from the control section, and the control section further includes means for detecting that the memory areas used for the client, the server and the CORBA library are not released even though the processes of the client, the server and the CORBA library are stopped; and means for sending the memory release instruction to the memory clearer when the detecting means detects that the memory areas used for the client, the server and the CORBA library are not released even though the processes of the client, the server and the CORBA library are stopped.

Further, in a CORBA partial restart system in a built-in device of the present invention, the client further includes means for requesting the memory controller to produce the memory information of the memory area used for the communication of the client itself; and the server further includes means for requesting the memory controller to produce the memory information of the memory area used for the communication of the server itself.

In addition, in a CORBA partial restart system in a built-in device of the present invention, the memory controller reserves memory areas required when the client and the server use an ORB interface, and produces the memory information of the required memory areas.

Usually, in a CORBA partial restart system in a built-in device according to the present invention, the memory controller, the client, the server and the CORBA library are included. However, the client or the server may be omitted depending on the kind of the built-in device according to other embodiments of the present invention.

In accordance with another aspect of the present invention, there is provided a CORBA partial restart system in a built-in device, comprising a memory controller; a client; and a control section; the memory controller controlling memory areas used for the client and a CORBA library by memory information; the client including first means for giving a notification that a defective condition arises in the CORBA library to the control section; second means for giving a notification that a defective condition arises in the client itself to the control section; and a constructor for requesting the memory controller to produce the memory information of the memory area used for the client itself; the control section including means for stopping processes of the client and the CORBA library when the defective condition of at least one of the client and the CORBA library is given from the client; and means for restarting the processes of the client and the CORBA library when the memory areas used for the client and the CORBA library are released after stopping the processes of the client and the CORBA library.

In accordance with a further aspect of the present invention, there is provided a CORBA partial restart system in a built-in device, comprising a memory controller; a server; and a control section; the memory controller controlling memory areas used for the server and a CORBA library by memory information; the server including first means for giving a notification that a defective condition arises in the CORBA library to the control section; second means for giving a notification that a defective condition arises in the server itself to the control section; and a constructor for requesting the memory controller to produce the memory information of the memory area used for the server itself; the control section including means for stopping processes of the server and the CORBA library when the defective condition of at least one of the server and the CORBA library is given from the server; and means for restarting the processes of the server and the CORBA library when the memory areas used for the server and the CORBA library are released after stopping the processes of the server and the CORBA library.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Referring now to the drawings, the following will be described an embodiment of the present invention in detail.

Figure 1:
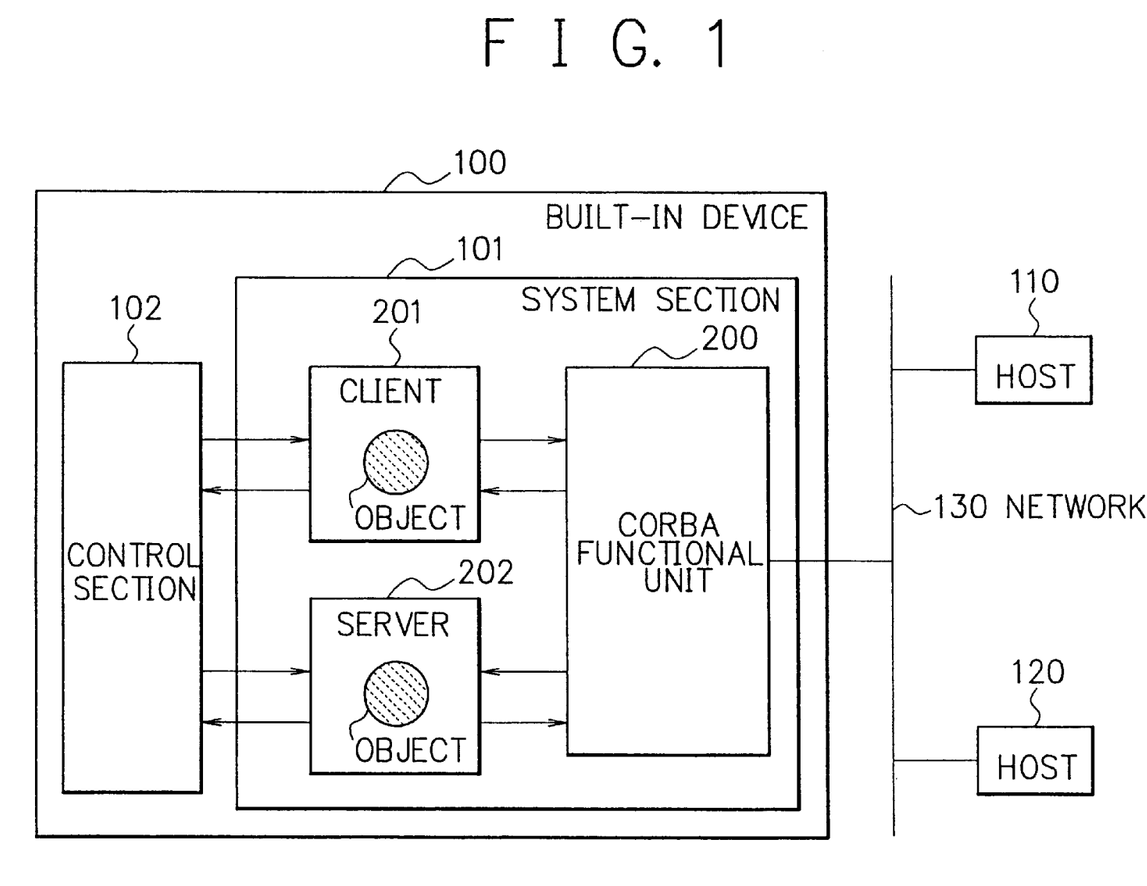
FIG. 1 is a conceptual diagram showing a CORBA partial restart system in a built-in device according to one embodiment of the present invention.

In FIG. 1, there is shown a CORBA partial restart system in a built-in device according to one embodiment of the present invention. In FIG. 1, a built-in device 100 such as an exchange is connected to hosts 110 and 120 via a network 130. The built-in device 100 comprises a system section 101 and a control section 102. The system section comprises a CORBA functional unit 200, a client 201 and a server 202. A workstation can be used for the hosts 110 and 120 and includes a CORBA functional unit, a client and a server. In addition to the system section 101 and the control section 102, the built-in device 100 further comprises a functional section which is not to be restarted (not shown).

Figure 2:
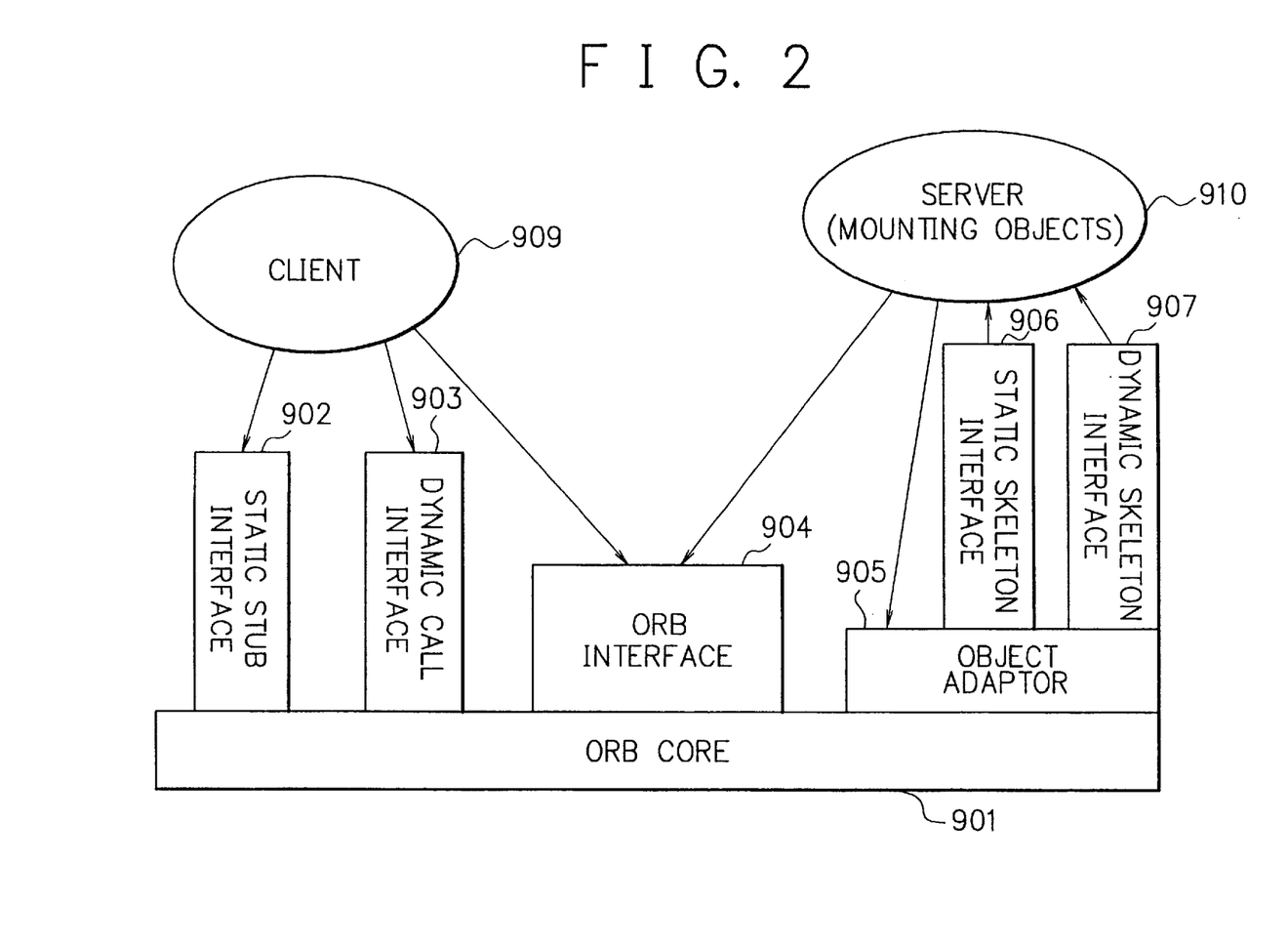
FIG. 2 is a conceptual diagram showing a CORBA architecture used in a CORBA functional unit shown in FIG. 1.
Figure 3:
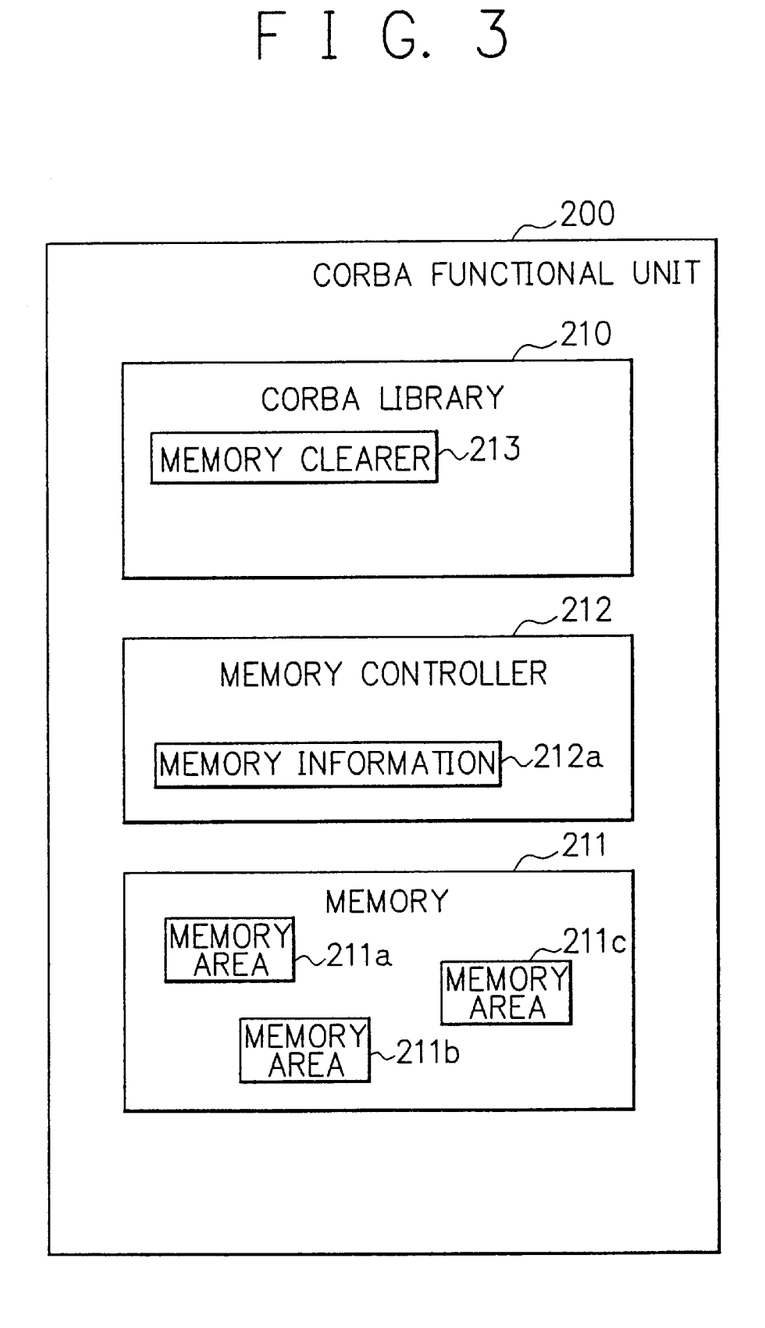
FIG. 3 is a conceptual diagram showing the CORBA functional unit shown in FIG. 1.

As shown in FIG. 2, the CORBA functional unit 200 includes CORBA architecture such as an ORB core 901, a static stub interface 902, a dynamic call interface 903, an ORB interface 904, an object adaptor 905, a static skeleton interface 906 and a dynamic skeleton interface 907. In FIG. 3, the CORBA functional unit 200 also includes a CORBA library 210, a memory controller 212 and a memory 211. The CORBA library 210 includes the ORB core 901, the static stub interface 902, the dynamic call interface 903, the ORB interface 904, the object adaptor 905, the static skeleton interface 906, the dynamic skeleton interface 907 and a memory clearer 213. The memory controller 212 includes memory information 212a. The memory 211 includes a first memory area 211a to be used for the server 202, a second memory area 211b to be used for the client 201 and a third memory area 211c to be used for the CORBA library 210.

The memory controller 212 has a function of producing the first, second and third memory areas 211a, 211b and 211c in the memory 211. The memory clearer 213 has a function of clearing the first, second and third memory areas 211a, 211b and 211c in the memory 211 produced by the memory controller 212. The memory information 212a is necessary information for controlling the memory 211 by the memory controller 212.

The client 201 and the server 202 are respectively correspond to a client 909 and a server (mounting objects) 910 of the CORBA architecture shown in FIG. 2 and are equipped in the built-in device 100.

The system section 101 has function of controlling the CORBA communication of the client 201 and the server 202 and controlling the memory 211 so as to reserve and release of the whole.

The control section 102 has four functions for (1) ordering to start and stop (end) the client 201 and the server 202, (2) ordering to release the memory 211 of the CORBA functional unit 200, (3) ordering to start "method(s)" mounted on the client 201 and (4) ordering to start "method(s)" mounted on the server 202. These "methods" are in an object and have a function of communicating with hosts 110 and 120. The "method" constitutes some function.

An order of the reserve of the memory 211 is carried out by the client 201, the server 202 and the CORBA library 210. The control section 102 does not order to reserve the memory 211. The control section 102 starts and stops only the memory clearer 213, but does not start and stop the other functional part(s) of the CORBA library 210.

The functional part(s) except the function of the memory clearer 213 in the CORBA library 210 is called from the client 201 and server 202. That is, when the client 201 and the server 202 are stopped, these functional parts except the function of the memory clearer 213 are stopped accordingly. The control section 102 can directly call only the function of the memory clearer 213 of the CORBA library 210.

Now, an operation of one embodiment of a CORBA partial restart system in a built-in device according to the present invention will be described with reference to FIG. 4.

First, just after the built-in device is started, the system section 101 stores a memory area (location and space) for storing the memory information 212a to be used for CORBA into the memory controller 212.

Figure 4:
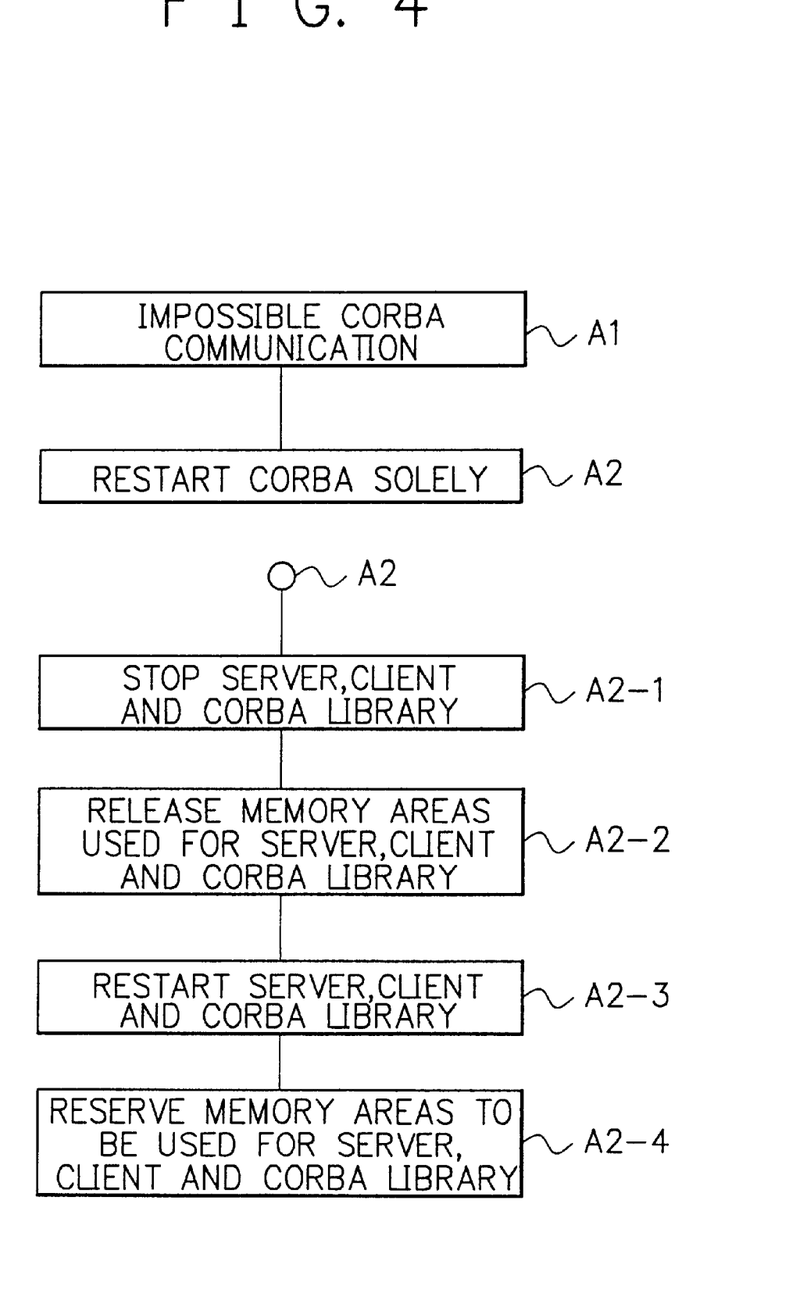
FIG. 4 is a flow chart showing an operation of the CORBA partial restart system in the built-in device shown in FIG. 1.

In FIG. 4, when CORBA communication becomes impossible (A1), the CORBA partial restart system in the built-in device restarts the CORBA solely (A2). The sole restart of the CORBA includes four steps, that is, (1) step of stopping the server 202, the client 201 and the CORBA library 210 (A2-1), (2) step of releasing the memory areas 211a, 211b and 211c of the memory 211 (A2-2), (3) step of restarting the server 202, the client 201 and the CORBA library 210 (A2-3) and (4) step of reserving the memory areas 211a, 211b and 211c to be used for the server 202, the client 201 and the CORBA library 210 (A2-4) are.

Then, a method for detecting an accident or a defective condition of the CORBA library 210, the client 201 and the server 202 by the control section 102 will be described.

When a defective condition arises in the CORBA library 210, the CORBA library 210 notifies the client 201 and the server 202 of receipt of some defective according to exceptions specified by the CORBA. After acknowledged the receipt of this defective condition of the CORBA library 210, the client 201 and the server 202 send the detection of the defective condition of the CORBA library 210 to the control section 102.

When a defective condition occurs in the client 201, the client 201 sends the occurrence of the defective condition to the control section 102. Similarly, when a defective condition happens in the server 202, the server 202 sends the happening of the defective condition to the control section 102.

A method for stopping the processes of the CORBA library 210, the client 201 and the server 202 will be described.

The control section 102 has its own functions for starting or restarting and stopping the processes of the CORBA library 210, the client 201 and the server 202. The control section 102 stops the processes of the CORBA library 210, the client 201 and the server 202 by executing their process stoppings. At the time of the process stoppings of the CORBA library 210, the client 201 and the server 202, their destructors are executed. However, there is a possibility that the destructors cannot be normally executed.

A method for releasing the memory areas 211a, 211b and 211c to be used for the server 202, the client 201 and the CORBA library 210 in the memory 211 will be described.

The destructors of the server 202, the client 201 and the CORBA library 210 release the memory areas 211a, 211b and 211c for the server 202, the client 201 and the CORBA library 210 in the memory 211.

However, when the CORBA communication is disabled in the built-in device 100, there is a possibility that unreleased memory areas still remain in the memory 211 due to the execution failure of their destructors. In this case, it is necessary to release the memory 211 by another function other than the destructors of the server 202, the client 201 and the CORBA library 210.

The control section 102 can be informed that the CORBA communication becomes impossible, as follows. That is, first, the exceptions representing the impossibility of the CORBA communication arise in the client 201 and the server 202, and the messages of the exceptions are sent from the client 201 and the server 202 to the control section 102. Second, when the client 201 cannot receive any response after transmitting any method from the client 201, the client 201 sends the message that no response is received to the control section 102.

The control section 102 can know that the unreleased memory area still remains in the memory 211, as follows. That is, the control section 102 sends a memory release instruction to the memory clearer 213, and the memory clearer 213 refers to the memory information 212a to know the memory usage condition and the known memory usage condition to the control section 102. Further, the CORBA library 210 may be provided with a memory usage condition checker which refers to the memory information 212a in order to know the memory usage condition and sends the known memory usage condition to the control section 102. The control section 102 can drive the memory usage condition checker.

When the control section 102 knows that the CORBA communication becomes impossible or that the unreleased memory areas still remain in the memory 211, the control section 102 sends the memory release instruction to the memory clearer 213, and the memory clearer 213 refers to the memory information 212a to know the locations and the spaces of the unreleased memory areas and clears up the unreleased memory areas.

A method for restarting the CORBA library 210, the client 201 and the server 202 will be described.

First, a method for restarting the processes of the CORBA library 210, the client 201 and the server 202 will be described.

The control section 102 has the own functions for starting or restarting and stopping the processes of the CORBA library 210, the client 201 and the server 202. The control section 102 restarts the processes of the CORBA library 210, the client 201 and the server 202 by executing their process restarting(s). After restarting the processes of the CORBA library 210, the client 201 and the server 202, their constructors are executed.

A method for reserving the memory areas 211a, 211b and 211c to be used for the server 202, the client 201 and the CORBA library 210 in the memory 211 will be described.

The constructors of the server 202, the client 201 and the CORBA library 210 reserve the memory areas 211a, 211b and 211c for the server 202, the client 201 and the CORBA library 210 in the memory 211. The constructors of the server 202, the client 201 and the CORBA library 210 call "method(s)" for storing the memory information 212a of the memory controller 212. In responding to call the method(s), the memory controller 212 stores the locations and spaces of the reserved memory areas into the memory information 212a.

When the client 201 and the server 202 further want to reserve a memory area for storing parameters required for using the ORB interface 904, the memory controller 212 reserves a memory area in the memory 211. In responding to call the "method(s)", the memory controller 212 stores the location and the space of the reserved memory area into the memory information 212a.

Although the system section 101 includes the client 201, the server 202 and the CORBA library 210 in the above-described embodiment of the present invention, the client 201 or the server 202 may be omitted from the system section 101 depending on the kind of the built-in device 100 according to other embodiments of the present invention. Further, in the present embodiment, when the CORBA partial restart system according to the present invention may be omitted the client 201 or the server 201, the above description of the client 201 or the server 201 may be interpreted to be omitted about the client 201 or the server 201, respectively.

As described above, according to the present invention, the sole restart of the CORBA can be carried out without restarting the whole built-in device, and thus the particular continuous operational functions of the built-in device cannot be stopped when an accident or a defective condition arises in the CORBA.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A CORBA partial restart system in a built-in device, comprising a memory controller; a client; a server; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, the control section including means for stopping processes of the client, the server and the CORBA library when the defective condition of at least one of the client, the server and the CORBA library is given from at least one of the client and the server; and means for restarting the processes of the client, the server and the CORBA library when the memory areas used for the client, the server and the CORBA library are released after stopping the processes of the client, the server and the CORBA library.

2. The CORBA partial restart system of claim 1, wherein the memory controller reserves memory areas required when the client and the server use an ORB interface, and produces the memory information of the required memory areas.

3. A CORBA partial restart system in a built-in device, comprising a memory controller; a client; a server; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, the control section including means for stopping processes of the client, the server and the CORBA library when the defective condition of at least one of the client, the server and the CORBA library is given from at least one of the client and the server; and means for restarting the processes of the client, the server and the CORBA library when the memory areas used for the client, the server and the CORBA library are released after stopping the processes of the client, the server and the CORBA library; and the CORBA library includes a memory clearer which refers to the memory information and releases the memory areas used for the client, the server and the CORBA library in response to a memory release instruction sent from the control section, and the control section further includes means for detecting that the memory areas used for the client, the server and the CORBA library are not released even though the processes of the client, the server and the CORBA library are stopped; and means for sending the memory release instruction to the memory clearer when the detecting means detects that the memory areas used for the client, the server and the CORBA library are not released even though the processes of the client, the server and the CORBA library are stopped.

4. The CORBA partial restart system of claim 3, wherein the memory controller reserves memory areas required when the client and the server use an ORB interface, and produces the memory information of the required memory areas.

5. A CORBA partial restart system in a built-in device, comprising a memory controller; a client; a server; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, the control section including means for stopping processes of the client, the server and the CORBA library when the defective condition of at least one of the client, the server and the CORBA library is given from at least one of the client and the server; and means for restarting the processes of the client, the server and the CORBA library when the memory areas used for the client, the server and the CORBA library are released after stopping the processes of the client, the server and the CORBA library; and the client further includes means for requesting the memory controller to produce the memory information of the memory area used for the communication of the client itself; and the server further includes means for requesting the memory controller to produce the memory information of the memory area used for the communication of the server itself.

6. The CORBA partial restart system of claim 5, wherein the memory controller reserves memory areas required when the client and the server use an ORB interface, and produces the memory information of the required memory areas.

7. A CORBA partial restart system in a built-in device, comprising a memory controller; a client; a server; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, the control section including means for stopping processes of the client, the server and the CORBA library when the defective condition of at least one of the client, the server and the CORBA library is given from at least one of the client and the server; and means for restarting the processes of the client, the server and the CORBA library when the memory areas used for the client, the server and the CORBA library are released after stopping the processes of the client, the server and the CORBA library;

the CORBA library includes a memory clearer which refers to the memory information and releases the memory areas used for the client, the server and the CORBA library in response to a memory release instruction sent from the control section, and the control section further includes means for detecting that the memory areas used for the client, the server and the CORBA library are not released even though the processes of the client, the server and the CORBA library are stopped; means for sending the memory release instruction to the memory clearer when the detecting means detects that the memory areas used for the client, the server and the CORBA library are not released even though the processes of the client, the server and the CORBA library are stopped; and the client further includes means for requesting the memory controller to produce the memory information of the memory area used for the communication of the client itself; and the server further includes means for requesting the memory controller to produce the memory information of the memory area used for the communication of the server itself.

8. The CORBA partial restart system of claim 7, wherein the memory controller reserves memory areas required when the client and the server use an ORB interface, and produces the memory information of the required memory areas.

9. A CORBA partial restart system in a built-in device, comprising a memory controller; a client; and a control section, the memory controller controlling memory areas used for the client and a CORBA library by memory information, the client including first means for giving a notification that a defective condition arises in the CORBA library to the control section; second means for giving a notification that a defective condition arises in the client itself to the control section; and a constructor for requesting the memory controller to produce the memory information of the memory area used for the client itself, the control section including means for stopping processes of the client and the CORBA library when the defective condition of at least one of the client and the CORBA library is given from the client; and means for restarting the processes of the client and the CORBA library when the memory areas used for the client and the CORBA library are released after stopping the processes of the client and the CORBA library.

10. The CORBA partial restart system of claim 1, wherein the memory controller reserves memory areas required when the client uses an ORB interface, and produces the memory information of the required memory areas.

11. A CORBA partial restart system in a built-in device, comprising a memory controller; a client; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the control section including means for stopping processes of the client and the CORBA library when the defective condition of at least one of the client and the CORBA library is given from at least one of the client; and means for restarting the processes of the client and the CORBA library when the memory areas used for the client and the CORBA library are released after stopping the processes of the client and the CORBA library; and the CORBA library includes a memory clearer which refers to the memory information and releases the memory areas used for the client and the CORBA library in response to a memory release instruction sent from the control section, and the control section further includes means for detecting that the memory areas used for the client and the CORBA library are not released even though the processes of the client and the CORBA library are stopped; and means for sending the memory release instruction to the memory clearer when the detecting means detects that the memory areas used for the client and the CORBA library are not released even though the processes of the client and the CORBA library are stopped.

12. The CORBA partial restart system of claim 11, wherein the memory controller reserves memory areas required when the client uses an ORB interface, and produces the memory information of the required memory areas.

13. A CORBA partial restart system in a built-in device, comprising a memory controller; a client; and a control section, the memory controller controlling memory areas used for the client, the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the control section including means for stopping processes of the client and the CORBA library when the defective condition of at least one of the client and the CORBA library is given from the client; and means for restarting the processes of the client and the CORBA library when the memory areas used for the client and the CORBA library are released after stopping the processes of the client and the CORBA library; and the client further includes means for requesting the memory controller to produce the memory information of the memory area used for the communication of the client itself.

14. The CORBA partial restart system of claim 13, wherein the memory controller reserves memory areas required when the client uses an ORB interface, and produces the memory information of the required memory areas.

15. A CORBA partial restart system in a built-in device, comprising a memory controller; a client; and a control section, the memory controller controlling memory areas used for the client and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the control section including means for stopping processes of the client and the CORBA library when the defective condition of at least one of the client and the CORBA library is given from at least one of the client; and means for restarting the processes of the client, the server and the CORBA library when the memory areas used for the client and the CORBA library are released after stopping the processes of the client and the CORBA library;

the CORBA library includes a memory clearer which refers to the memory information and releases the memory areas used for the client and the CORBA library in response to a memory release instruction sent from the control section, and the control section further includes means for detecting that the memory areas used for the client and the CORBA library are not released even though the processes of the client and the CORBA library are stopped;

means for sending the memory release instruction to the memory clearer when the detecting means detects that the memory areas used for the client and the CORBA library are not released even though the processes of the client and the CORBA library are stopped; and the client further includes means for requesting the memory controller to produce the memory information of the memory area used for the communication of the client itself.

16. The CORBA partial restart system of claim 15, wherein the memory controller reserves memory areas required when the client uses an ORB interface, and produces the memory information of the required memory areas.

17. A CORBA partial restart system in a built-in device, comprising a memory controller; a server; and a control section, the memory controller controlling memory areas used for the server and a CORBA library by memory information, the server including first means for giving a notification that a defective condition arises in the CORBA library to the control section; second means for giving a notification that a defective condition arises in the server itself to the control section; and a constructor for requesting the memory controller to produce the memory information of the memory area used for the server itself, the control section including means for stopping processes of the server and the CORBA library when the defective condition of at least one of the server and the CORBA library is given from the server; and means for restarting the processes of the server and the CORBA library when the memory areas used for the server and the CORBA library are released after stopping the processes of the server and the CORBA library.

18. The CORBA partial restart system of claim 17, wherein the memory controller reserves memory areas required when the server uses an ORB interface, and produces the memory information of the required memory areas.

19. A CORBA partial restart system in a built-in device, comprising a memory controller; a server; and a control section, the memory controller controlling memory areas used for the server and a CORBA library by memory information, the client including first means for giving a notification that a defective condition arises in the CORBA library to the control section; second means for giving a notification that a defective condition arises in the client itself to the control section; and a first constructor for requesting the memory controller to produce the memory information of the memory area used for the client itself, the control section including means for stopping processes of the server and the CORBA library when the defective condition of at least one of the server and the CORBA library is given from at least one of the server; and means for restarting the processes of the server and the CORBA library when the memory areas used for the server and the CORBA library are released after stopping the processes of the server and the CORBA library; and the CORBA library includes a memory clearer which refers to the memory information and releases the memory areas used for the server and the CORBA library in response to a memory release instruction sent from the control section, and the control section further includes means for detecting that the memory areas used for the server and the CORBA library are not released even though the processes of the server and the CORBA library are stopped; and means for sending the memory release instruction to the memory clearer when the detecting means detects that the memory areas used for the server and the CORBA library are not released even though the processes of the server and the CORBA library are stopped.

20. The CORBA partial restart system of claim 19, wherein the memory controller reserves memory areas required when the server uses an ORB interface, and produces the memory information of the required memory areas.

21. A CORBA partial restart system in a built-in device, comprising a memory controller; a server; and a control section, the memory controller controlling memory areas used for the client, the server and a CORBA library by memory information, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, and the control section including means for stopping processes of the server and the CORBA library when the defective condition of at least one of the server and the CORBA library is given from at least one of the server; and means for restarting the processes of the server and the CORBA library when the memory areas used for the server and the CORBA library are released after stopping the processes of the server and the CORBA library.

22. The CORBA partial restart system of claim 21, wherein the memory controller reserves memory areas required when the server uses an ORB interface, and produces the memory information of the required memory areas.

23. A CORBA partial restart system in a built-in device, comprising a memory controller; a server; and a control section, the memory controller controlling memory areas used for the client, the server and a CORBA library by memory information, the server including third means for giving the notification that the defective condition arises in the CORBA library to the control section; fourth means for giving a notification that a defective condition arises in the server itself to the control section; and a second constructor for requesting the memory controller to produce the memory information of the memory area used for the server itself, the control section including means for stopping processes of the server and the CORBA library when the defective condition of at least one of the server and the CORBA library is given from at least one of the server; and means for restarting the processes of the server and the CORBA library when the memory areas used for the server and the CORBA library are released after stopping the processes of the server and the CORBA library;

the CORBA library includes a memory clearer which refers to the memory information and releases the memory areas used for the server and the CORBA library in response to a memory release instruction sent from the control section, and the control section further includes means for detecting that the memory areas used for the server and the CORBA library are not released even though the processes of the server and the CORBA library are stopped; and means for sending the memory release instruction to the memory clearer when the detecting means detects that the memory areas used for the server and the CORBA library are not released even though the processes of the server and the CORBA library are stopped.

24. The CORBA partial restart system of claim 23, wherein the memory controller reserves memory areas required when the server uses an ORB interface, and produces the memory information of the required memory areas.

* * * * *